United States Patent
Lin

(10) Patent No.: US 7,187,952 B2
(45) Date of Patent: Mar. 6, 2007

(54) METHOD OF ACCEPTING A PHONE CALL BASED ON MOTION PROPERTIES OF THE PHONE AND RELATED DEVICE

(75) Inventor: Cheng-Lung Lin, Nan-Tou Hsien (TW)

(73) Assignee: BenQ Corporation, Tao-Yuan Hsien (TW)

(*) Notice: Subject to any disclaimer, the term of this patent is extended or adjusted under 35 U.S.C. 154(b) by 144 days.

(21) Appl. No.: 10/906,778

(22) Filed: Mar. 7, 2005

(65) Prior Publication Data

US 2006/0199605 A1    Sep. 7, 2006

(51) Int. Cl.
*H04M 1/00* (2006.01)

(52) U.S. Cl. .................. 455/567; 455/90.3; 455/550.1; 455/575.3; 455/575.1

(58) Field of Classification Search ............. 455/575.1, 455/575.3, 575.4, 90.3, 550.1, 567, 556.1, 455/458; 379/433.13, 433.04; D14/137–138
See application file for complete search history.

(56) References Cited

U.S. PATENT DOCUMENTS

| | | | | |
|---|---|---|---|---|
| 5,636,265 A | * | 6/1997 | O'Connell et al. | 455/412.1 |
| 5,924,046 A | * | 7/1999 | Martensson | 455/567 |
| 6,094,565 A | * | 7/2000 | Alberth et al. | 455/575.3 |
| 6,330,457 B1 | * | 12/2001 | Yoon | 455/550.1 |
| 6,549,792 B1 | * | 4/2003 | Cannon et al. | 455/550.1 |
| 6,766,182 B2 | * | 7/2004 | Janninck et al. | 455/575.3 |
| 7,127,271 B1 | * | 10/2006 | Fujisaki | 455/556.1 |
| 2006/0078098 A1 | * | 4/2006 | Sereboff | 379/93.02 |
| 2006/0105817 A1 | * | 5/2006 | Naick et al. | 455/567 |
| 2006/0128448 A1 | * | 6/2006 | Lim | 455/575.3 |
| 2006/0223591 A1 | * | 10/2006 | Wang et al. | 455/567 |
| 2006/0229118 A1 | * | 10/2006 | Kaneko | 455/575.3 |
| 2006/0252464 A1 | * | 11/2006 | Vander Veen et al. | 455/567 |

* cited by examiner

*Primary Examiner*—Pablo N. Tran
(74) *Attorney, Agent, or Firm*—Winston Hsu

(57) ABSTRACT

A method of accepting a phone call comprises applying a force to the phone when receiving an incoming phone call on the phone to effect motion properties on the phone, detecting the motion properties of the phone, and deciding whether to accept the incoming phone call according to the motion properties.

6 Claims, 7 Drawing Sheets

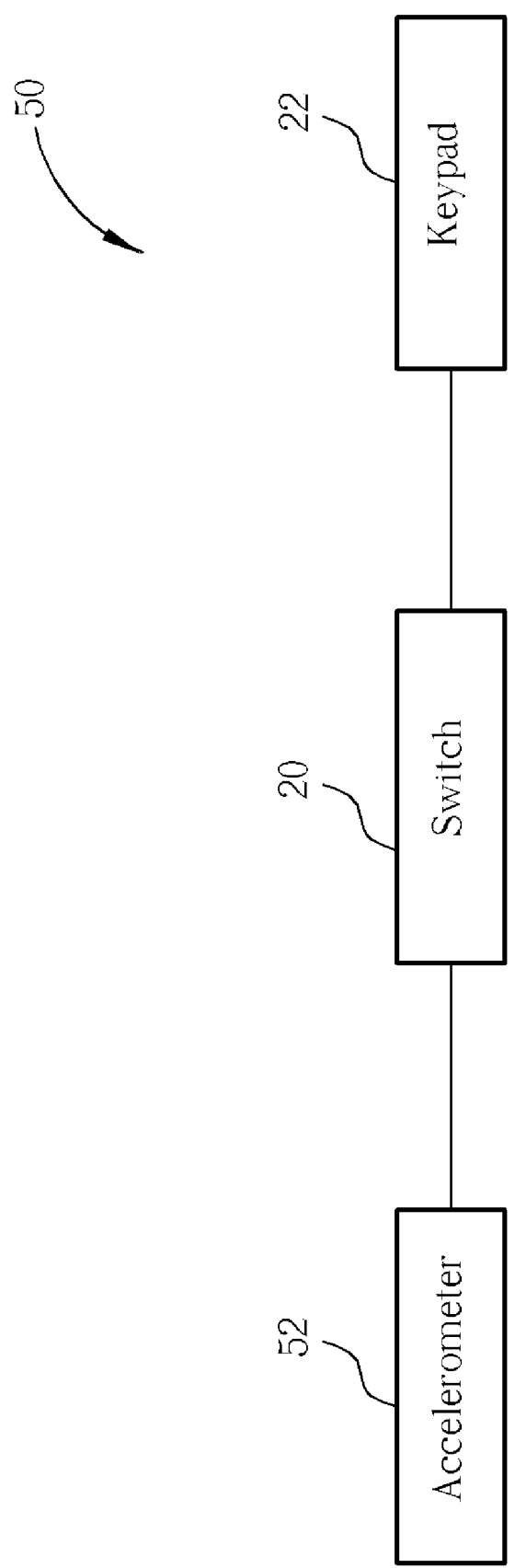

METHOD OF ACCEPTING A PHONE CALL BASED ON MOTION PROPERTIES OF THE PHONE AND RELATED DEVICE

BACKGROUND OF INVENTION

1. Field of the Invention

The present invention relates to a method of accelerating a phone for triggering the phone to answer an incoming phone call.

2. Description of the Prior Art

Mobile phones and cordless phones can each be carried around freely for making and receiving phone calls. Typically, when a phone call is received, a user presses a button on the phone, such as a "Talk" button, to answer the incoming phone call. Unfortunately, the buttons on the phone are not always easy to find, and delay in pressing the correct button can lead to users missing calls by not answering the calls in time.

SUMMARY OF INVENTION

It is therefore an objective of the claimed invention to provide a method and related device for answering an incoming phone call by applying an acceleration to the phone in order to solve the above-mentioned problems.

According to the claimed invention, a method of accepting a phone call comprises applying a force to the phone when receiving an incoming phone call on the phone to effect motion properties on the phone, detecting the motion properties of the phone, and deciding whether to accept the incoming phone call according to the motion properties.

The invention also relates to a method of accepting a phone call. The method comprises rotating the phone when receiving an incoming phone call, detecting the magnitude of a rotational velocity at which the phone is rotated, and deciding whether to accept the incoming phone call according to the rotational velocity.

The invention also relates to a phone answering system. The system comprises a gyroscope for detecting a rotational velocity at which a phone is rotated when the phone is receiving an incoming phone call, the rotational velocity having a magnitude. The system also comprises a switch coupling to the gyroscope to receive the magnitude of the rotational velocity, the switch controlling the phone to answer the incoming phone call according to the magnitude of the rotational velocity.

It is an advantage of the claimed invention that the user of the phone does not have to find and press a button on the phone in order to answer an incoming phone call. The user simply has to apply a force to the phone in order to trigger the phone to answer the incoming phone call. This way of answering incoming phone calls is both more convenient for the user and saves time, which may reduce the number of missed calls.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 7 is a block diagram of a phone answering system according to a third embodiment of the present invention.

DETAILED DESCRIPTION

Figure 1:
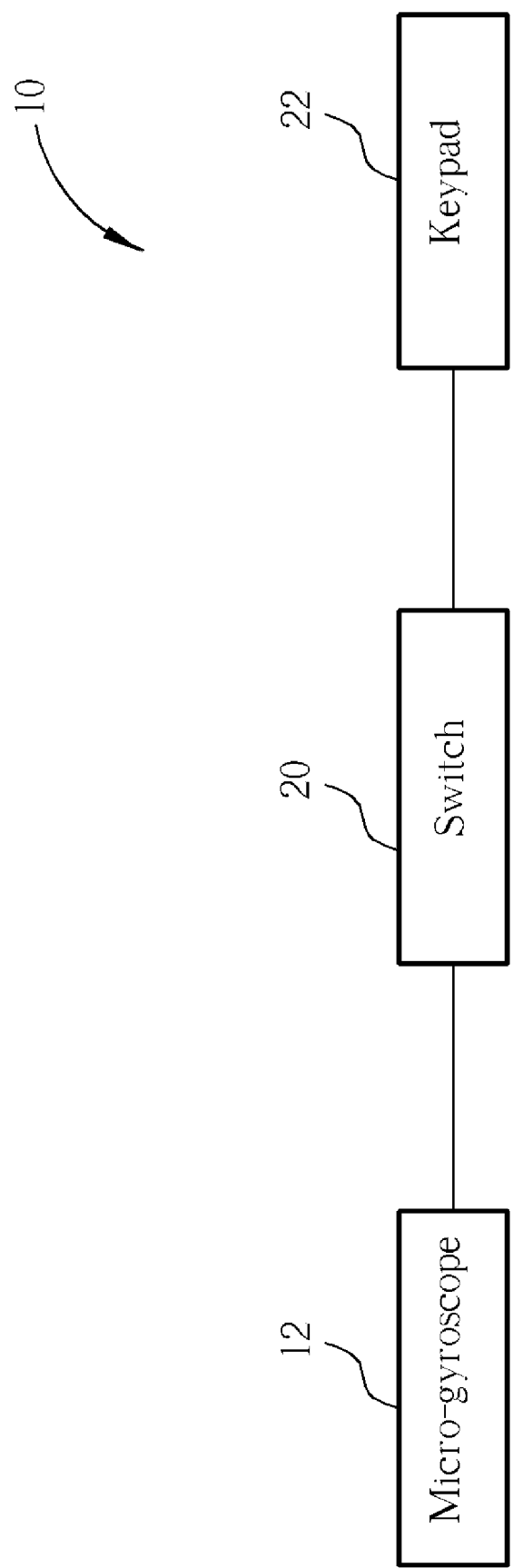
FIG. 1 is a functional block diagram of a phone answering system according to a first embodiment of the present invention.

Please refer to FIG. 1. FIG. 1 is a functional block diagram of a phone answering system 10 according to a first embodiment of the present invention.

The phone answering system 10 comprises a micro-gyroscope 12, a switch 20, and a keypad 22. The keypad 22 can be used to control the normal operation of a phone utilizing the phone answering system 10. For instance, the keypad 22 can be used to make phone calls, to send text messages, to answer incoming phone calls, and to terminate phone calls.

The micro-gyroscope 12 is used to detect a rate at which the phone is rotated, and for generating an output voltage based on the magnitude of the rotational velocity of the phone. When a phone call is received on the phone, the phone can simply be rotated for answering the phone call instead of having to press a key on the keypad 22. If the rotational velocity measured by the micro-gyroscope 12 is greater than a predetermined rotational velocity value, then the switch 20 is activated to answer the incoming phone call. On the other hand, the user also has the option of answering the incoming phone call the traditional way. That is, pressing the designated key on the keypad 22 also activates the switch 20 to answer incoming phone calls.

Similarly, phone calls can also be terminated by either rotating the phone or by pressing the correct key on the keypad 22. The relevant settings for controlling operation of the micro-gyroscope 12 and the keypad 22 can be customized by the user of the phone or by the manufacturer.

The present invention is ideally applied to cordless phones and mobile phones since these phones are not required to be placed in a cradle. However, the present invention may also be applied to a variety of other electronic devices. The basic concept of the present invention is that the electronic device is rotated or accelerated for answering a phone call, terminating a phone call, or for performing any other chosen action.

Figure 2:
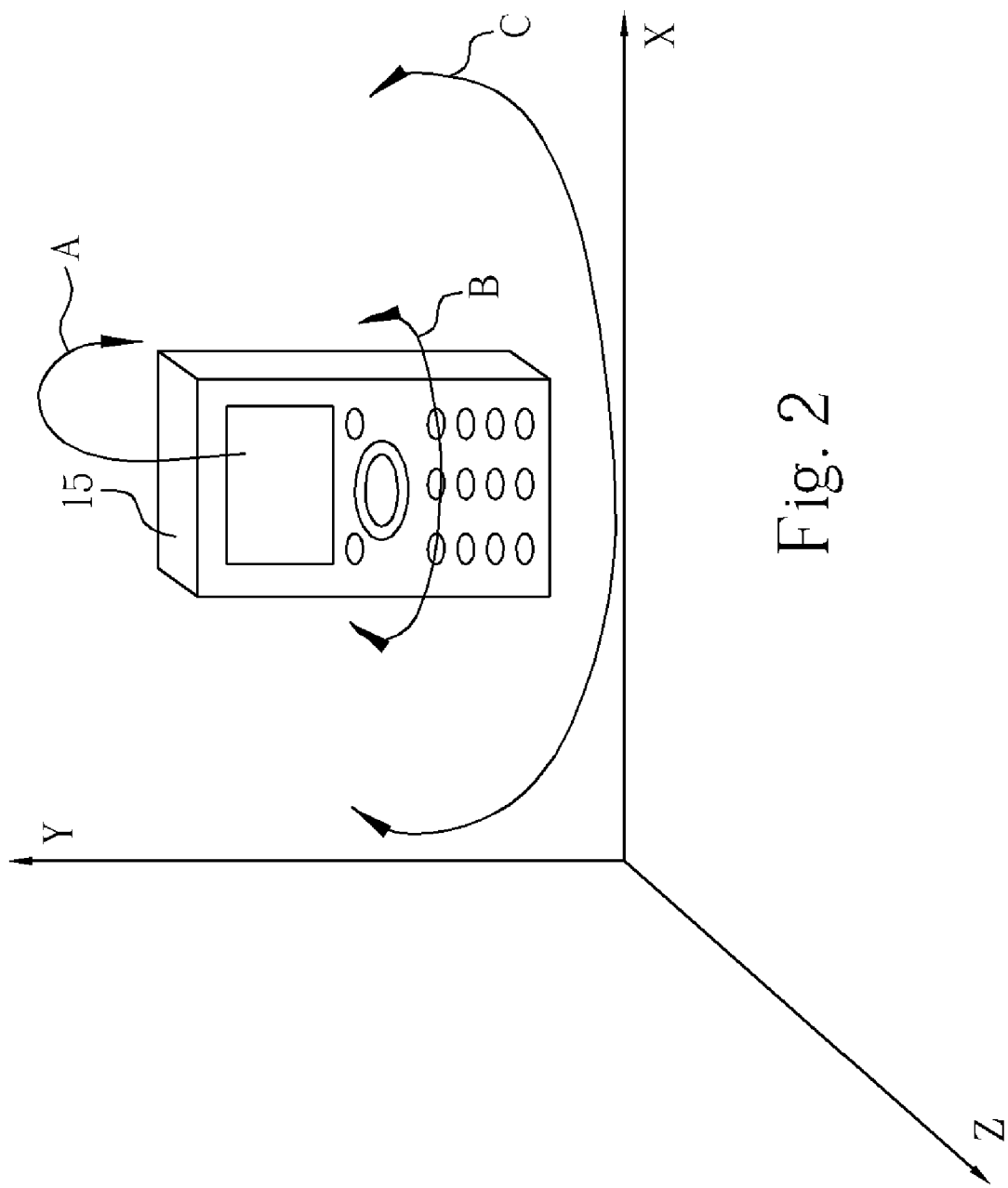
FIG. 2 illustrates directions in which a phone can be rotated for answering an incoming phone call.

In the first embodiment of the present invention, the phone is rotated to trigger the phone to answer an incoming phone call. Please refer to FIG. 2. FIG. 2 illustrates directions A, B, and C in which a phone 15 can be rotated for answering an incoming phone call. The micro-gyroscope 12 is preferably able to detect angular velocity in any direction in three-dimensional space. Therefore, all a user has to do to answer an incoming phone call is to rotate the phone 15 in any direction such that the rotational velocity is greater than the predetermined rotational velocity value. As shown in FIG. 2, the phone 15 can be rotated in any of the directions A, B, and C as well as any other direction in the X-Y-Z three-dimensional space.

Figure 3:
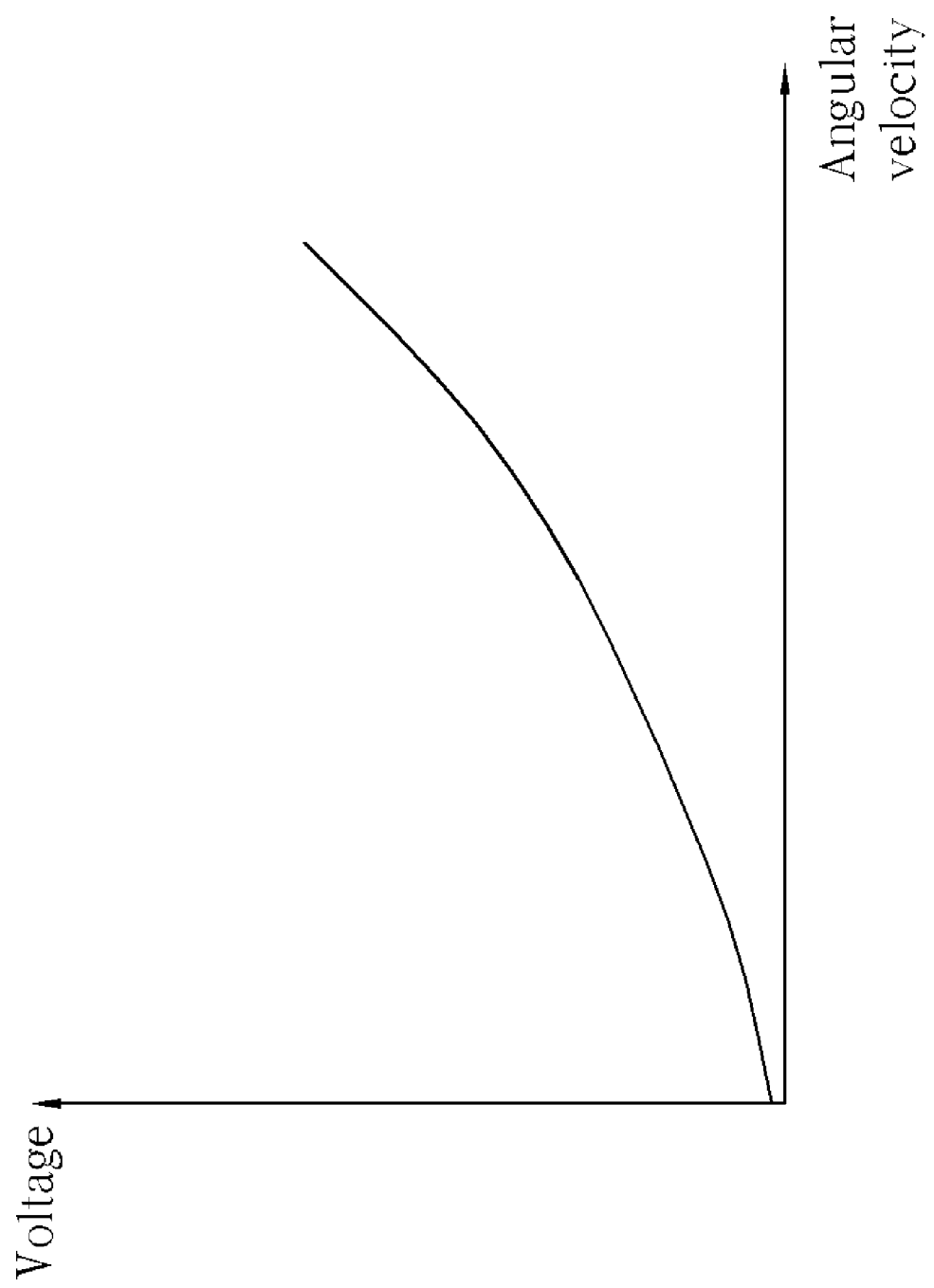
FIG. 3 is a graph illustrating a voltage output by the micro-gyroscope versus an angular velocity measured by the micro-gyroscope.

Please refer to FIG. 3. FIG. 3 is a graph illustrating a voltage output by the micro-gyroscope 12 versus an angular velocity measured by the micro-gyroscope 12. The graph in FIG. 3 shows that as the angular velocity increases, the voltage output by the micro-gyroscope 12 also increases. The curve shown in FIG. 3 is merely provided as an example, and is not meant for restricting the types of micro-gyroscopes that can be used. It should be noted that besides micro-gyroscopes, other types of gyroscopes and other motion sensing devices such as accelerometers could also be used.

Figure 4:
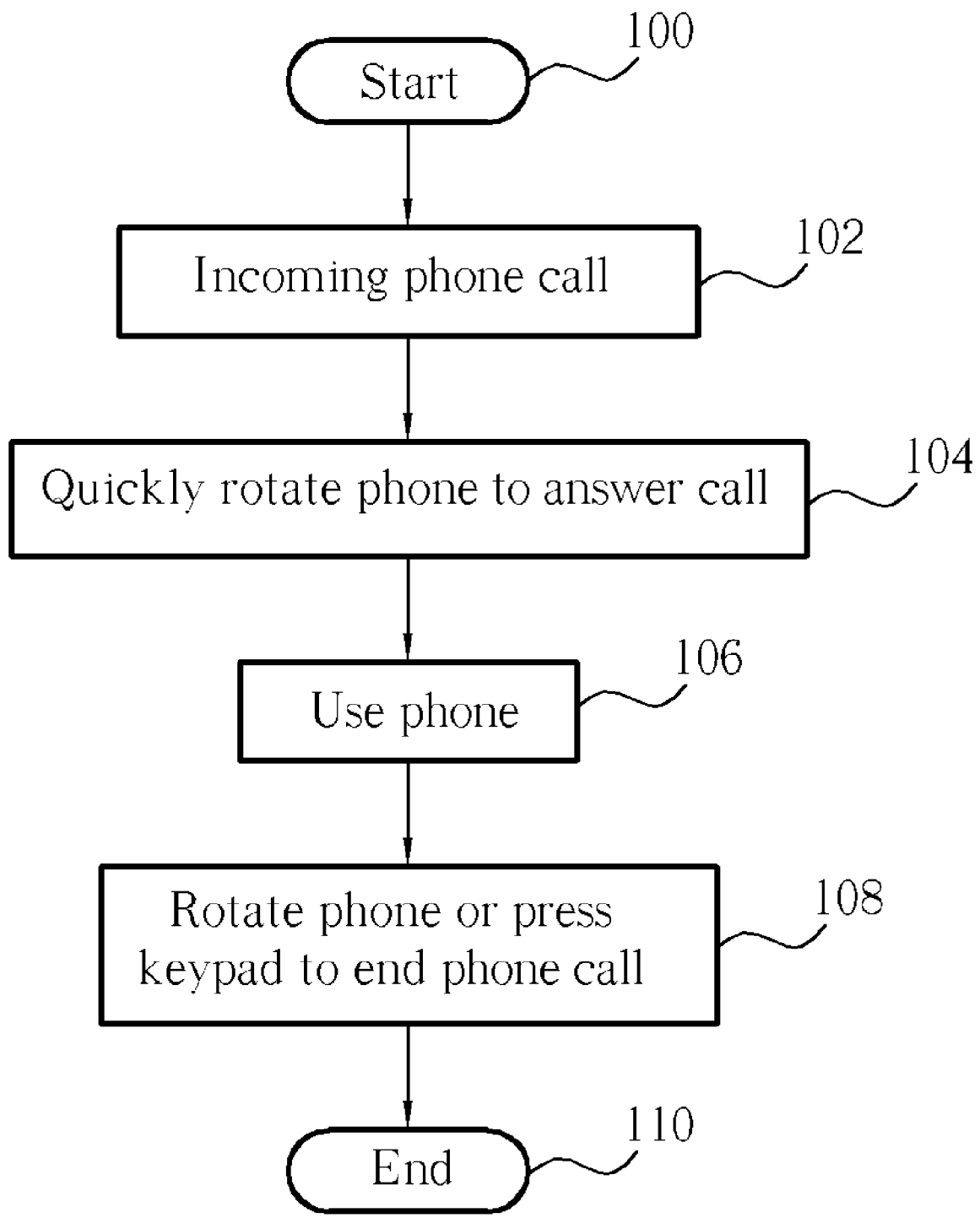
FIG. 4 is a flowchart illustrating the method for answering an incoming phone call according to the first embodiment of the present invention.

Please refer to FIG. 4. FIG. 4 is a flowchart illustrating the method for answering an incoming phone call according to the first embodiment of the present invention. Steps contained in the flowchart will be explained below.

Step 100: Start;

Step 102: An incoming phone call is received by a phone utilizing the phone answering system 10;

Step 104: The phone is rotated with a rotational velocity greater than the minimum predetermined rotational velocity value for answering the incoming phone call;

Step 106: The phone call continues;

Step 108: The user either rotates the phone again or presses a key on the keypad 22 to trigger the phone to terminate the phone call; and Step 110: End.

Figure 5:
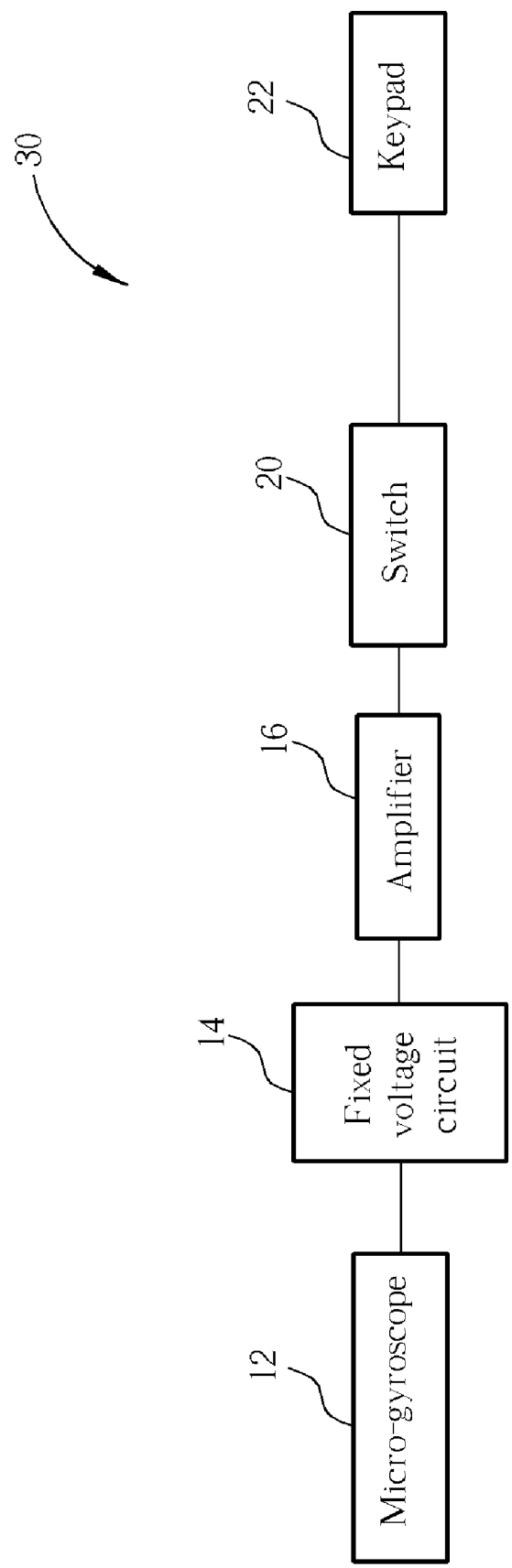
FIG. 5 is a block diagram of a phone answering system according to a second embodiment of the present invention.

The first embodiment of the present invention provides a simple way to answer and terminate phone calls through the use of the micro-gyroscope 12. If the voltage value output by the micro-gyroscope 12 is not large enough to trigger the switch 20, then additional circuitry will be needed to amplify the signal output by the micro-gyroscope 12. Please refer to FIG. 5. FIG. 5 is a block diagram of a phone answering system 30 according to a second embodiment of the present invention. Like the phone answering system 10 shown in FIG. 1, the phone answering system 30 comprises the micro-gyroscope 12 for detecting rotational velocities, the keypad 22, and the switch 20 used for answering and terminating incoming phone calls. The phone answering system 30 also comprises a fixed voltage circuit 14 for comparing the voltage outputted by the micro-gyroscope 12 to a threshold voltage value $V_{Th}$, and for outputting a first or second voltage value depending on the voltage output by the micro-gyroscope 12. An amplifier 16 is used for amplifying the first or second voltage value outputted by the fixed voltage circuit 14 before sending the amplified voltage value to the switch 20.

Figure 6:
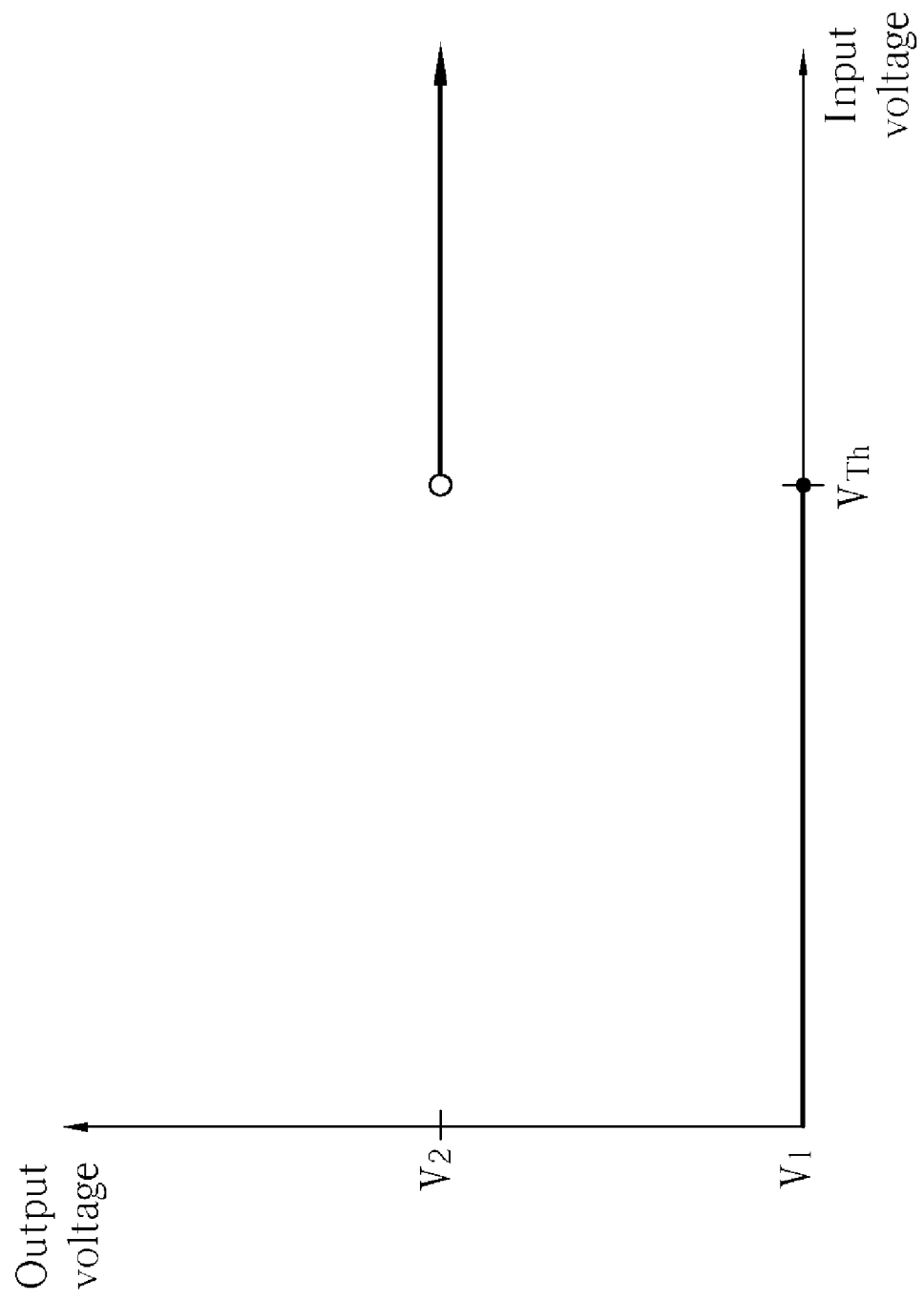
FIG. 6 shows a graph illustrating operation of the fixed voltage circuit of the second embodiment of the present invention.

Please refer to FIG. 6. FIG. 6 shows a graph illustrating operation of the fixed voltage circuit 14 of the second embodiment of the present invention. If the input voltage that the fixed voltage circuit 14 receives from the micro-gyroscope 12 is less than or equal to the threshold voltage value $V_{Th}$, the fixed voltage circuit 14 outputs a first voltage value $V_1$. On the other hand, if the input voltage that the fixed voltage circuit 14 receives from the micro-gyroscope 12 is greater than the threshold voltage value $V_{Th}$, the fixed voltage circuit 14 outputs a second voltage value $V_2$. The voltage output by the fixed voltage circuit 14 is then sent to the amplifier 16 for amplifying the output voltage of the fixed voltage circuit 14. The amplified voltage value is able to trigger the switch 20 if the rotational value of the phone measured by the micro-gyroscope 12 is greater than the predetermined rotational velocity value. Please note that if the voltage output of the micro-gyroscope 12 is great enough to trigger the switch 20, then the fixed voltage circuit 14 and the amplifier 16 are not necessary, and the first embodiment phone answering system 10 can be used instead of the second embodiment phone answering system 30.

Please refer to FIG. 7. FIG. 7 is a block diagram of a phone answering system 50 according to a third embodiment of the present invention. Instead of utilizing a micro-gyroscope to detect rotational velocity of the phone, the phone answering system 50 contains an accelerometer 52 for measuring acceleration of the phone. If the phone is accelerated in any direction, the accelerometer 52 will output a voltage large enough to trigger the switch 20 to accept and terminate phone calls. Like the previous embodiments, the keypad 22 can also be used for triggering the switch 20. When a phone utilizing the phone answering system 50 receives a phone call, all the user has to do is apply a force to the phone in order to give the phone an acceleration value greater than a predetermined acceleration value in order to accept the incoming phone call.

To prevent users from accidentally accepting or terminating phone calls, it will be appreciated that the predetermined rotational velocity value and the predetermined acceleration value can be made sufficiently high to minimize or eliminate these accidental occurrences.

In summary, with the present invention method, the phone user no longer has to find and press a button on the phone in order to answer an incoming phone call. The user simply has to apply a force or a rotational velocity to the phone in order to trigger the phone to answer the incoming phone call. In this way, answering incoming phone calls is both more convenient for the user and saves time, which may reduce the number of missed calls.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phone answering system, comprising:
   a gyroscope for detecting a rotational velocity at which a phone is rotated when the phone is receiving an incoming phone call, the rotational velocity having a magnitude; and
   a switch coupling to the gyroscope to receive the magnitude of the rotational velocity, the switch controlling the phone to answer the incoming phone call according to the magnitude of the rotational velocity.

2. The system of claim 1, further comprising a comparator connecting with the gyroscope and the switch, wherein the comparator compares the magnitude of the rotational velocity with a predetermined rotational velocity value and provides a comparison result to the switch.

3. The system of claim 2, wherein the comparator comprises a fixed voltage circuit for outputting a first voltage value if the magnitude of the rotational velocity is less than or equal to the predetermined rotational velocity value, and for outputting a second voltage value if the magnitude of the rotational velocity is greater than the predetermined rotational velocity value.

4. The system of claim 3, wherein the fixed voltage circuit further comprises an amplifier circuit for amplifying the first voltage value or the second voltage value output by the fixed voltage circuit to create an amplified voltage value, and for outputting the amplified voltage value to the switch to control the switch.

5. The system of claim 1, wherein the gyroscope is a micro-gyroscope.

6. The system of claim 1, wherein the phone is a mobile phone.

* * * * *